United States Patent
Kim et al.

(10) Patent No.: US 8,635,506 B2
(45) Date of Patent: Jan. 21, 2014

(54) DATA TRANSMISSION/RECEIVING METHOD IN MULTIMEDIA BROADCAST MULTICAST SERVICE SYSTEM AND APPARATUS THEREOF

(75) Inventors: Jung-Im Kim, Daejon (KR);
Kyoung-Seok Lee, Daejon (KR);
Jae-Heung Kim, Daejon (KR);
Byung-Han Ryu, Daejon (KR);
Seung-Chan Bang, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 850 days.

(21) Appl. No.: 12/665,661

(22) PCT Filed: Jun. 20, 2008

(86) PCT No.: PCT/KR2008/003530
§ 371 (c)(1),
(2), (4) Date: Dec. 18, 2009

(87) PCT Pub. No.: WO2008/156336
PCT Pub. Date: Dec. 24, 2008

(65) Prior Publication Data
US 2010/0325509 A1 Dec. 23, 2010

(30) Foreign Application Priority Data

Jun. 20, 2007 (KR) .......................... 10-2007-0060396

(51) Int. Cl.
*G06F 11/00* (2006.01)
(52) U.S. Cl.
USPC .......................................... 714/749; 714/750
(58) Field of Classification Search
None
See application file for complete search history.

(56) References Cited

U.S. PATENT DOCUMENTS

2007/0071025 A1* 3/2007 Bergstrom et al. ........... 370/448

FOREIGN PATENT DOCUMENTS

KR 102006001491 2/2006

OTHER PUBLICATIONS ( ETRI, "Considerations on uplink feedback for multi-cell MBMS," 3GPP TSG RAN WG2 #58bis, R2-072625, 2 pages, (2007).*
3GPP TS 26.346 V6.1.0, "3rd Generation Partnership Project; Technical Specification Group Services and System Aspects; Multimedia Broadcast/Multicast Service (MBMS); Protocols and codecs, Release 6," GSM® Global System for Mobile Communications (2005).
3GPP TSG RAN WG2 #54, "Evaluating point-to-point bearer for single-cell MBMS transmission," R2-062445, retrieved online at http://www.3gpp.org/ftp/tsg_ran/WG2_RL2/TSGR2_54/Documents/ (2006).
3GPP TSG RAN WG2 #56, "Design of HARQ feedback channel for MBMS," R2-063277 retrieved online at http://www.3gpp.org/ftp/tsg_ran/WG2_RL2/TSGR2_56/Documents/ (2006).
ETRI, "Considerations on uplink feedback for multi-cell MBMS," 3GPP TSG RAN WG2 #58bis, R2-072625, 2 pages, (2007).

* cited by examiner

*Primary Examiner* — Scott Baderman
*Assistant Examiner* — Jason Bryan
(74) *Attorney, Agent, or Firm* — Nelson Mullins Riley & Scarborough LLP (57) ABSTRACT

Provided is a Multimedia Broadcast Multicast Service (MBMS); and, more particularly, a data transmission/receiving method in a multimedia broadcast multicast service system, and an apparatus thereof. The data transmitting method in the MBMS system includes the step of checking a terminal receiving data provided from the MBMS and the step of determining whether there is error report feedback on retransmission of the data according to the number of the detected terminals.

20 Claims, 3 Drawing Sheets

DATA TRANSMISSION/RECEIVING METHOD IN MULTIMEDIA BROADCAST MULTICAST SERVICE SYSTEM AND APPARATUS THEREOF

RELATED APPLICATIONS

This application is a 35 U.S.C. §371 national stage filing of PCT Application No. PCT/KR2008/003530 filed on Jun. 20, 2008, which claims priority to, and the benefit of, Korean Patent Application No. 10-2007-0060396 filed on Jun. 20, 2007. The contents of the aforementioned applications are hereby incorporated by reference.

TECHNICAL FIELD

The present invention relates to a Multimedia Broadcast Multicast Service (MBMS); and, more particularly, to a data transmission/reception method in a multimedia broadcast multicast service system, and an apparatus thereof.

BACKGROUND ART

A Multimedia Broadcast Multicast Service (MBMS) is multimedia broadcast and multicast service in a 3rd Generation Partnership Project (3GPP) wireless communication system. The MBMS service adopts a method for simultaneously transmitting data in multi-cell. The multi-cell transmit data in order to lower an error rate by combining a plurality of signals transmitted in different cells.

In case of Release-6 MEMS of 3GPP, data are transmitted from a plurality of cells. However, since a 3GPP Release-6 system is an asynchronous system, it cannot simultaneously receive the data transmitted from a terminal even if data are transmitted from a plurality of cells. Accordingly, there is a difficulty that the terminal should independently receive and combine signals transmitted from each cell. Although a plurality of errors occur due to a poor channel state, the terminal does not report the errors and data are not retransmitted. In order to lower the error rate, data repetition is performed in an application layer. The data transmission repetition is performed without feedback on a radio channel from the terminal. Accordingly, there is a problem in that data transmission repetition is performed while wasting radio resources even in a situation that data transmission repetition is not required.

In a 3GPP Long Term Evolution (LTE) MEMS service which is introduced after Release-6 and Release-7, when MBMS is serviced in the multi-cell, the cells transmit the same contents simultaneously.

In the multi-cell transmission, it is possible to lower the error rate by providing the terminal with reception signals of a higher strength than that of signals for a single cell. However, the low error rate is not provided to all the terminals within the entire coverage of the multi-cell. That is, it is difficult to expect the low error rate in case of terminals having a large cell radius and located in cell boundaries, and a terminal of a cell located in the boundary of multi-cell, not at the center of the multi-cell. On the other hand, it is easy to expect the low error rate in cells having a small radius and located at the center of the multi-cell. Therefore, when the radio channel environment is poor in the multi-cell transmission, a method for reducing a packet error rate is required. Accordingly, when an error occurs, it is required to retransmit the data.

The 3GPP Release-6 and Release-7 systems perform counting and recounting to check the existence of the terminal receiving the MEMS service. During counting and recounting procedures, the terminal hoping to receive MEMS service should response through Random Access Channel. In the Release-6 and 7 systems, a controlling radio network controller (C-RNC) controls interference caused by excessive random access between terminals by notifying probability information that the terminal should respond to the counting through the random access channel for counting and recounting.

The 3GPP LTE MBMS service performs polling, which is simpler than the counting and recounting in order to check whether there is a terminal receiving the MBMS data in the cell. However, there is a problem in that a polling procedure and a feedback channel for performing polling are not defined.

DISCLOSURE

Technical Problem

An embodiment of the present invention is directed to raising efficiency of retransmission for correcting an error occurring in a radio channel, e.g., Hybrid Automatic Repeat reQuest (HARQ), when a wireless communication system simultaneously performs broadcast and multicast services in multi-cell.

Another embodiment of the present invention is directed to providing a polling method of methods for checking whether there is a terminal receiving a service and a method for operating a feedback channel which is required to perform retransmission for correcting an error occurring in a radio channel.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a data transmitting method in a Multimedia Broadcast Multicast Service (MBMS) system, includes: checking a terminal receiving data provided from the MBMS; and determining whether there is error report feedback on retransmission of the data according to the number of the detected terminals.

In accordance with another aspect of the present invention, there is provided a data receiving method in an MBMS system, including: checking whether to receive data provided from the MEMS; and controlling a feedback channel based on control information including feedback channel information according to whether or not there is error report feedback on retransmission of the data determined according to the number of the detected terminals.

In accordance with another aspect of the present invention, there is provided a data transmitting apparatus in an MBMS system, including: a communication unit for checking a terminal receiving data provided from the MBMS; and a control unit for determining whether or not there is an error report feedback on retransmission of the data according to the number of the detected terminals.

In accordance with another aspect of the present invention, there is provided a data receiving apparatus in an MBMS system, including: a communication unit for checking whether to receive data provided from the MBMS; and a control unit for controlling a feedback channel based on control information including feedback channel information according to whether or not there is error report feedback on retransmission of the data determined according to the number of the detected terminals.

The advantages, features and aspects of the invention will become apparent from the following description of the embodiments with reference to the accompanying drawings, which is set forth hereinafter. Therefore, those skilled in the art of the present invention can embody the technological concept and scope of the invention easily. In addition, if it is considered that detailed description on a related art may obscure the points of the present invention, the detailed description will not be provided herein. Specific embodiments of the present invention will be described in detail hereinafter with reference to the attached drawings.

Advantageous Effects

The present invention can efficiently use radio resources by preventing unnecessary data repetition.

Also, the present invention can efficiently use radio resources by in a neighboring cell operating different retransmission methods according to the number of terminals receiving data to thereby prevent large interference from occurring and preventing unnecessary data retransmission.

BEST MODE FOR THE INVENTION

Following description exemplifies only the principles of the present invention. Even if they are not described or illustrated clearly in the present specification, one of ordinary skill in the art can embody the principles of the present invention and invent various apparatuses within the concept and scope of the present invention. The use of the conditional terms and embodiments presented in the present specification are intended only to make the concept of the present invention understood, and they are not limited to the embodiments and conditions mentioned in the specification.

In addition, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

For example, block diagrams of the present invention should be understood to show a conceptual viewpoint of an exemplary circuit that embodies the principles of the present invention. Similarly, all the flowcharts, state conversion diagrams, pseudo codes and the like can be expressed substantially in a computer-readable medium, and whether or not a computer or a processor is described distinctively, they should be understood to express various processes operated by a computer or a processor.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

In the claims of the present specification, an element expressed as a means for performing a function described in the detailed description is intended to include all methods for performing the function including all formats of software, such as combinations of circuits for performing the intended function, firmware/microcode and the like. To perform the intended function, the element is cooperated with a proper circuit for performing the software. The present invention defined by claims includes diverse means for performing particular functions, and the means are connected with each other in a method requested in the claims. Therefore, any means that can provide the function should be understood to be an equivalent to what is figured out from the present specification.

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

The present invention checks a terminal receiving data of Multimedia Broadcast Multicast Service (MBMS) in a cell and determines presence of error report feedback on retransmission for correcting an error occurring in a radio channel according to the number of the terminals receiving data.

A polling method is adopted to check the terminal receiving MBMS data in the cell. The polling is performed to search a terminal interested in the MBMS data in the current cell to thereby avoid unnecessary MBMS transmission. The terminal performs polling response to a polling request for checking whether MBMS data reception is required.

When it is checked that the number of terminals receiving the MBMS data in the cell or an MBMS over Single Frequency Network (MBSFN) region is large, a retransmission method without the error report feedback is selected as a retransmission method for correcting the error occurring in the radio channel. It is because there is a possibility to perform retransmission to a large number of terminals and a strong interference signal is given to a neighboring cell due to increase of the error report feedback for requesting retransmission from the terminal, i.e., feedback for requesting retransmission due to the errors of the received MBMS data, when there are a large number of terminals receiving the MBMS data.

When it is checked that there are a large number of terminals receiving the MBMS data, a base station notifies a retransmission without error report feedback, reception information on a selected channel and time to the terminal.

On the other hand, when it is checked that there are a few terminals receiving the MBMS data in the cell or MBSFN region, a retransmission method with error report feedback is selected as a retransmission method for correcting the error occurring in the radio channel. Since there are a few signals of feedback requesting retransmission from the terminal in case where there are a few terminals receiving the MBMS data, a possibility to give large interference to the neighboring cell is low. Meanwhile, when it is checked that there are a few terminals receiving the MEMS data and retransmission is performed with error report feedback, a feedback channel for retransmission is used as feedback of the terminal for correcting the error occurring in the radio channel. The base station notifies usage information on feedback channel to the terminal through the control channel.

Accordingly, radio resources can be efficiently operated by performing retransmission only on the data having an error and preventing unnecessary retransmission. This will be described in detail with an embodiment hereinafter.

First Embodiment

Data Transmitting Method in MBMS System

A data transmitting method in an MBMS system in accordance with the present invention includes the steps of checking a terminal receiving data provided in the MEMS and determining presence of error report feedback on data retransmission according to the number of detected terminals.

Figure 1:
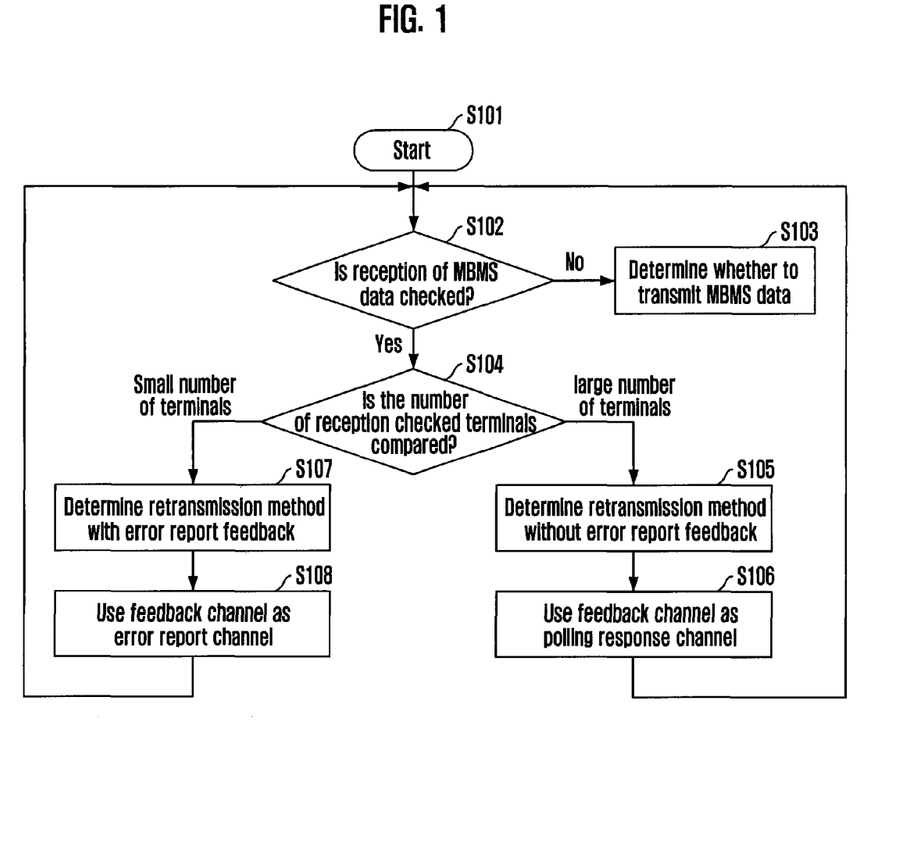
FIG. 1 is a flowchart describing a Multimedia Broadcast Multicast Service (MBMS) data transmitting/receiving method in accordance with an embodiment of the present invention.

FIG. 1 is a flowchart describing an MBMS data transmitting/receiving method in accordance with an embodiment of the present invention and will be described with reference to FIG. 1.

A system starts in a cell at step S101. The cell includes a multi-cell. A base station, i.e., eNode B, transmitting an MBMS service in a 3rd Generation Partnership Project Long Term Evolution (3GPP LTE) system is divided into a base station for transmitting a unicast service and an MBMS service and a base station for transmitting only the MBMS service. The former is a mixed cell and the latter is a dedicated cell. In case of the mixed cell, the base station performs the unicast and MEMS services at a predetermined frequency band and transmits the unicast and MEMS services, respectively according to each time. The dedicated cell performs only the MBMS service at one frequency band.

While the service is provided since before the MBMS service is started, each cell is checked at step S102 whether there is a terminal receiving MEMS data in the cell. The step of checking reception of the MEMS data includes the step of transmitting a polling request message to the terminal in order to check whether the base station is to receive the MBMS data and the step of transmitting a polling response message to the base station as a response to the polling request message. The polling method is one of the methods for checking whether there are terminals receiving any kinds of services. When the terminal does not respond to the polling response message as a meaning that the terminal refuses to receive the data provided from the MBMS, the base station determines at step S103 whether to transmit the MBMS data based on no response. Reversely, when the terminal inputs a reception acceptance message of receiving the MBMS data in the polling response message, the base station checks the terminal transmitting the reception acceptance message with respect to the MBMS data.

Since a large number of terminals transmit the polling response message in the present invention, polling response is performed using an identifier of the terminal. The identifier is defined based on a time cycle of polling and a time interval of polling response. For example, the terminal identifier defines a predetermined time cycle (P) corresponding to a polling cycle and a time interval (T) of a channel for polling response by performing a modular (%) operation as P/T. In this case, when P is 10 s and the terminal polling response cycle is 100 ms, polling response, i.e., feedback for polling request, is performed for each time of terminal identifier % 100 (10 s/100 ms).

It is determined at step S104 according to the number of terminals checked by the reception acceptance message whether there is error report feedback on MBMS data retransmission. The error report feedback on retransmission means feedback for requesting retransmission since there is an error in the received MBMS data. The retransmission of the MBMS data means to retransmit the pre-transmitted data to correct the error occurring due to poor environment of the radio channel such as a Hybrid Automatic Repeat reQuest (HARQ) method.

A strong interference signal may be generated in the neighboring cell in case that when there are a large number of terminals receiving the MBMS data, a large number of terminals transmit the error report feedback for requesting retransmission to the base station. On the other hand, since a few terminals transmit the error report feedback for requesting retransmission to the base station in case that there are a few terminals receiving the MBMS data, it is possible to prevent generation of the strong interference signal in the neighboring cell. Therefore, the present invention can efficiently use radio resources by determining whether there is error report feedback of the terminal for retransmission of MBMS data according to the number of terminals receiving the MBMS data.

When there are a large number of terminals receiving the MBMS data, the retransmission method without error report feedback is determined at step S105 for retransmission of the MEMS data. When there are a large number of terminals receiving the MBMS data, there is a possibility that the number of terminals receiving the MBMS data including errors increases. In this case, since the number of terminals transmitting the feedback for the error report notifying that the error is included in the transmitted MBMS data to the base station also increases, the strong interference signal can be given to the neighboring cell. Accordingly, when there are a large number of terminals receiving the MBMS data, the retransmission method without feedback for error report is selected. Since there is no feedback for error report, reception acceptance message with respect to the MBMS data are transmitted by using the polling response message at step S106. Accordingly, it can be prevented to give the strong interference signal to the neighboring cell. The retransmission method without error report feedback is to perform retransmission on the MBMS data with respect to the terminals where reception acceptance is checked.

That is, when the base station requests the terminal according to the polling method whether to receive the MBMS data and the number of responding terminals is sufficient, the base station notifies a time for the terminal to respond to the polling and probability information and receives polling response of the terminal. The terminal feeds back polling response based on the information notified by the base station. At this time, when a signal-to-noise ratio (SNR) of the cell is low, i.e., when the radio channel environment is poor, the base station performs retransmission of the data to the terminals. When a large number of terminals have a good radio channel environment but a few terminals have a poor radio channel environment, retransmission is performed on the entire terminals. Since polling is repeatedly performed, a feedback channel is used as a channel for error report of retransmission, not for polling response in case where the number of terminals receiving the MBMS data decreases in a procedure of transmitting the MBMS data and reaches a predetermined level, a pre-set up value. At this time, it is unnecessary that the base station equalizes radio resource locations of the error report channel for hybrid retransmission and the channel for polling response. The size and location of the feedback channel are determined according to the number of terminals.

On the other hand, when the number of terminals receiving the MBMS data is small, the retransmission method with the error report feedback is determined at step S107 as a retransmission method of the MBMS data. When the number of terminals receiving the MBMS data is small, the number of terminals receiving the MBMS data including errors is also small. In this case, although the feedback for error report notifying that the error is included in the MBMS data transmitted from the terminal is transmitted to the base station, it does not lead to large interference in the neighboring cell since the number of terminals transmitting feedback is small. Meanwhile, the channel for feedback in the retransmission method with the error report feedback is used as a channel for error report at step S108.

Since the retransmission method with error report feedback performs retransmission only on the MBMS data having errors, it is possible to prevent unnecessary data retransmission.

That is, when the base station requests the terminal according to the polling method whether to receive the MBMS data, the base station determines to use the error report feedback channel in case where the terminals are not sufficient, and performs retransmission only in case where the terminal performs error report. When the number of the error reports increases and reaches the predetermined level, i.e., the preset value, the base station determines not to use the error report feedback channel but notifies the terminal to use the channel for transmitting the polling response. At this time, the terminal performs feedback based on the polling response time notified by the base station and the probability information. In this case, the base station performs retransmission on the entire data. The terminals receive only the data having errors after retransmission.

A cyclic redundancy check (CRC) method is adopted for error report and HARQ mechanism is adopted for retransmission.

Meanwhile, the number of terminals receiving the MBMS data is determined by comparing the number of the terminal whose reception acceptance is checked with the preset value described above. The preset value is set up based on the retransmission amount of the MBMS data according to whether there is feedback on retransmission.

For example, a case that there are a large number of terminals means a case that the number of terminals is larger than the retransmission amount of the MBMS data in a state that there is no error report, i.e., feedback, since retransmission is performed on a plurality of MBMS data by reporting a plurality of errors in the terminals when the base station allocates the feedback channel for error report.

On the other hand, a case that there are a few terminals means a case that the number of terminals is smaller than the retransmission amount of the MBMS data in a state that there is no error report, i.e., feedback, since retransmission is performed on a small quantity of MBMS data by reporting a small number of errors in the terminals when the base station allocates the feedback channel for error report.

Meanwhile, a reference for selecting a feedback channel is set up in consideration of efficiency of radio resources for each base station. It is determined according to the reference whether the feedback channel is used as a channel for polling response or a channel for error report.

When the feedback channel is used only as the channel for polling response, there is a benefit that neighboring cell interference caused by feedback for error report of retransmission does not occur. Also, when the feedback channel is used as the channel for error report of retransmission, the base station checks that the terminal exists through existence of the feedback channel. It has a benefit that unnecessary retransmission is prevented by performing retransmission only on the data having errors, not the entire data.

A signal transmission procedure between the base station and the terminal according to the number of terminals will be described hereinafter.

Figure 2:
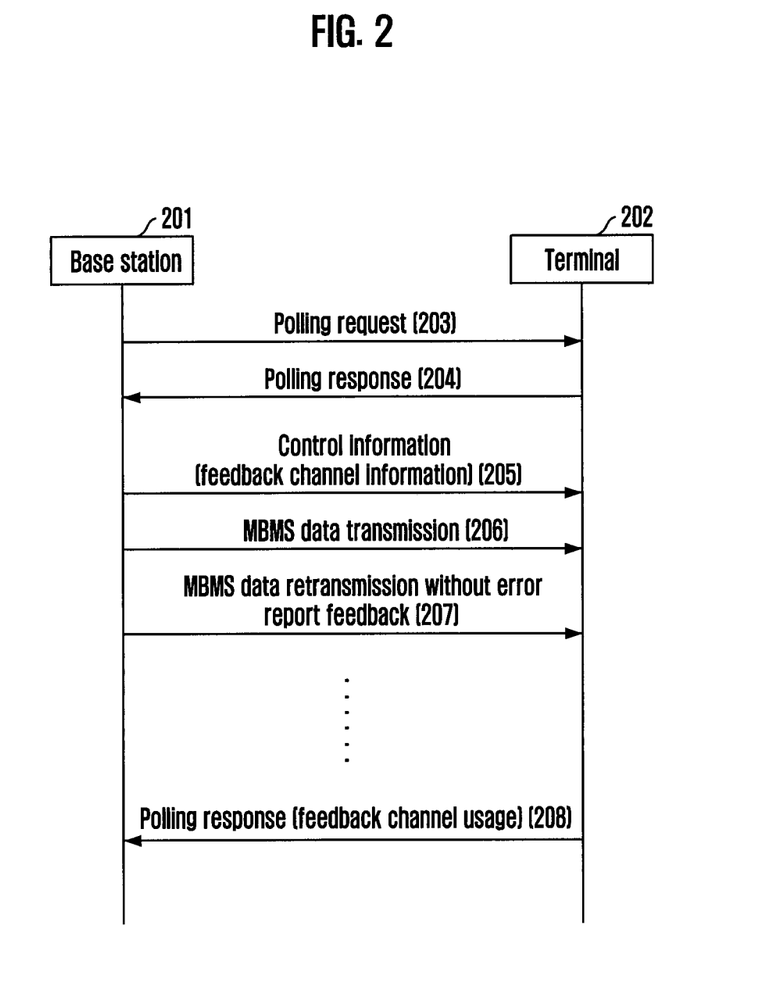
FIG. 2 shows a signal transmission procedure between a base station and a terminal when there are a large number of terminals accepting signal reception in accordance with an embodiment of the present invention.
Figure 3:
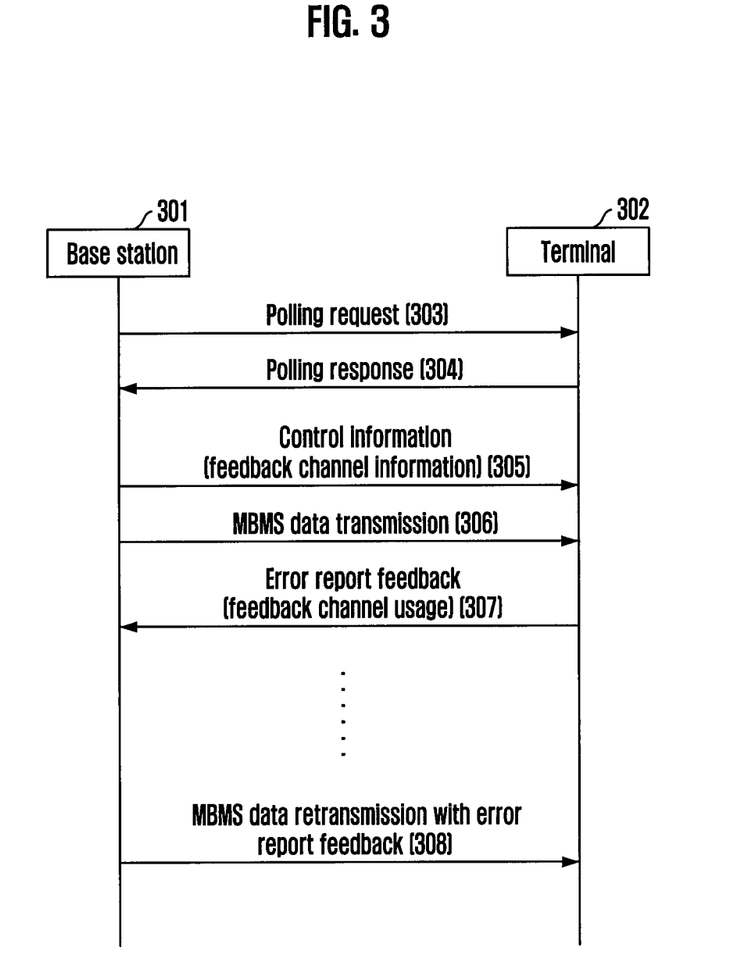
FIG. 3 shows a signal transmission procedure between the base station and the terminal when there are a small number of terminals accepting signal reception in accordance with an embodiment of the present invention.

FIG. 2 shows a signal transmission procedure between the base station and the terminal in case where there are a large number of terminals accepting signal reception in accordance with an embodiment of the present invention and FIG. 3 shows a signal transmission procedure between the base station and the terminal in case where there are a small number of terminals accepting signal reception in accordance with an embodiment of the present invention.

1. Case where there are a Large Number of Terminals Accepting Signal Reception

Referring to FIG. 2, a base station 201 transmits a polling request message to a terminal 202 (see 203). The terminal transmits a polling response message to the base station as a response for the polling request message (see 204). The base station 201 checks a terminal accepting signal reception in the polling response message transmitted from the terminal 202 and determines presence of feedback on retransmission of the MBMS data according to the number of terminals accepting signal reception. When there are a large number of terminals accepting signal reception, the base station 201 determines a data transmitting method as the method without feedback error report on retransmission of the MBMS data. The base station 201 transmits control information on transmission of the polling response to the terminal 202 according to the determined method (see 205). The terminal 202 receives control information. The base station 201 transmits the MBMS data to the terminal 202 (see 206). Although errors are included in the received MBMS data, the terminal 202 does not report the error. The base station 201 retransmits the MEMS data to the terminals accepting signal reception (see 207). In a next polling procedure, the terminal 202 transmits the polling response to the base station 201 through the feedback channel (see 208).

2. Case where there are a Small Number of Terminals Accepting Signal Reception

Referring to FIG. 3, a base station 301 transmits a polling request message to the terminal 302 (see 303). The terminal transmits a polling response message to the base station as a response for the polling request message (see 304). The base station 301 checks a terminal accepting signal reception in the polling response message transmitted from the terminal 302 and determines presence of error report feedback on retransmission of the MBMS data according to the number of terminals accepting signal reception. When there are a small number of terminals accepting signal reception, the base station 301 determines a data transmitting method as the method with feedback error report on retransmission of the MBMS data. The base station 301 transmits to the terminal 302 control information directing the terminal to use the feedback channel for transmitting the error report according to the determined method (see 305). The terminal 302 allocates the channel for error report as a feedback channel. The base station 301 transmits the MBMS data to the terminal 302 (see 306). When the received MBMS data include errors, the terminal 302 transmits the error report to the base station 301 through the feedback channel (see 307). The base station 301 retransmits the MBMS data only to the terminals performing the error report (see 308).

Second Embodiment

Data Receiving Method in MBMS System

The data receiving method in a Multimedia Broadcast Multicast Service (MBMS) system in accordance with another embodiment of the present invention includes the step of checking whether the data provided from the MBMS are received, and the step of controlling a feedback channel based on control information including feedback channel information according to whether or not there is the error report feedback on retransmission of the data determined by the number of the detected terminals. The HARQ mechanism is adopted for retransmission.

The step of checking whether the data provided from the MBMS are received includes the step of receiving a polling request message for requesting polling of checking whether the data provided from the MEMS is to be received, and the step of transmitting a polling response message for polling response on the polling request message to the base station. The polling response is performed based on an identifier and the identifier is defined based on a polling time cycle and a time interval of polling response.

Determination is performed by comparing the number of the reception detected terminals with the preset value. When the number of detected terminals is larger than the preset value, the retransmission method without error report feedback is determined for data retransmission and the feedback channel is used as a channel for transmitting the polling response message. When the number of detected terminals is smaller than the preset value, the retransmission method with error report feedback is determined for data retransmission and the feedback channel is used as a channel for transmitting the error report. The preset value is set up based on the retransmission amount of data according to whether or not there is feedback. When the number of detected terminals is larger than the preset value, the determined retransmission method is to perform data retransmission without remaining data. When the number of detected terminals is smaller than the preset value, the determined retransmission method is to perform retransmission only on the data whose errors are reported. The cyclic redundancy check (CRC) method is used for error report.

Since detailed description related to the present embodiment is sufficiently provided in the first embodiment described above, it will not be provided herein.

Third Embodiment

Data Transmitting Apparatus in MBMS System

The data transmitting apparatus in a Multimedia Broadcast Multicast Service (MBMS) system in accordance with another embodiment of the present invention includes a communication unit for checking a terminal receiving data provided from the MBMS and a control unit for determining whether there is error report feedback on data retransmission according to the number of detected terminals. Hybrid Automatic Repeat reQuest (HARQ) mechanism is adopted for retransmission.

The communication unit includes a transmitting unit for transmitting a polling request message of requesting polling for checking whether to receive the data provided from the MBMS to the terminal, and a receiving unit for receiving a polling response message for polling response to the polling request message from the terminal. The polling response is performed by an identifier. The identifier is defined based on a time cycle of polling and a time interval of polling response.

Determination is performed by comparing the number of reception detected terminals with a preset value. When the number of detected terminals is larger than the preset value, the retransmission method without error report feedback is adopted for data retransmission. A channel for feedback is used as a channel for receiving the polling response message. When the number of detected terminals is smaller than the preset value, the retransmission method with error report feedback is adopted for data retransmission and the channel for feedback is used as a channel for receiving error report. The preset value is set up based on the retransmission amount of data according to whether or not there is feedback. When the number of detected terminals is larger than the preset value, retransmission is performed on the entire data according to the determined retransmission method. When the number of detected terminals is smaller than the preset value, retransmission is performed on the data reported to have an error according to the determined retransmission method. The cyclic redundancy check (CRC) method is adopted for error report.

Since detailed description related to the present embodiment is sufficiently provided in the first embodiment described above, it will not be provided herein.

Fourth Embodiment

Data Receiving Apparatus in MBMS System

The data receiving apparatus in Multimedia Broadcast Multicast Service (MBMS) system in accordance with still another embodiment of the present invention includes a communication unit for checking whether to receive data provided from the MBMS, and a control unit for controlling a feedback channel by receiving control information including feedback channel information according to whether or not there is error report feedback on transmission retransmission of the data determined by the number of detected terminals. Hybrid Automatic Repeat reQuest (HARQ) mechanism is adopted for retransmission.

The communication unit includes a receiving unit for receiving a polling request message for requesting polling of checking whether to receive data provided from the MBMS, and a transmitting unit for transmitting a polling response message for polling response to the polling request message to the base station. The polling response is performed by an identifier and the identifier is defined based on a time cycle of polling and a time interval of polling response.

Determination is performed by comparing the number of reception detected terminals with a preset value. When the number of detected terminals is larger than the preset value, the retransmission method without error report feedback is adopted for data retransmission. A channel for feedback is used as a channel for transmitting the polling response message. When the number of detected terminals is smaller than the preset value, the retransmission method with error report feedback is adopted for data transmission retransmission and the channel for feedback is used as a channel for transmitting error report. The preset value is set up based on the retransmission amount of data according to whether or not there is feedback. When the number of detected terminals is larger than the preset value, retransmission is performed on the entire data according to the determined retransmission method. When the number of detected terminals is smaller than the preset value, retransmission is performed on the data reported to have an error according to the determined retransmission method. The cyclic redundancy check (CRC) method is adopted for error report.

Since detailed description related to the present embodiment is sufficiently provided in the first embodiment described above, it will not be provided herein.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

While the present invention has been described with respect to certain preferred embodiments, it will be apparent to those skilled in the art that various changes and modifications may be made without departing from the scope of the invention as defined in the following claims.

INDUSTRIAL APPLICABILITY

The present invention is applied to enhance operation efficiency of a feedback channel related to retransmission in a method and apparatus for transmitting/receiving MBMS data.

What is claimed is:

1. A data transmitting method in a Multimedia Broadcast Multicast Service (MBMS) system, comprising:
   detecting terminals receiving data provided from the MBMS; and
   determining whether to use a first retransmission method using error report feedback for data retransmission or a second retransmission method not using error report feedback for data retransmission based on the number of the detected terminals.

2. The data transmitting method of claim 1, wherein said detecting a terminal receiving data includes:
   transmitting to a terminal a polling request message for requesting polling of whether to receive the data provided from the MBMS; and
   receiving a polling response message for polling response to the polling request message from the terminal.

3. The data transmitting method of claim 2, wherein the polling response is made using an identifier.

4. The data transmitting method of claim 3, wherein the identifier is used for determining when the polling response is received from the terminal based on a predetermined polling cycle (P) and a polling interval (T).

5. The data transmitting method of claim 2, wherein the determination is made comparing the number of the detected terminals with a preset value.

6. The data transmitting method of claim 5, wherein the determining further comprises:
   when the number of the detected terminals is larger than the preset value, adopting the second retransmission method to transmit data repeatedly; and
   when the number of the detected terminals is smaller than the preset value, adopting the first retransmission method and receiving the error report feedback through the feedback channel.

7. The data transmitting method of claim 6, wherein the preset value is set up based on an amount of retransmitted data.

8. The data transmitting method of claim 6, wherein when the number of the detected terminals is larger than the preset value, data retransmission is performed on all of data based on the determined retransmission method; and
   when the number of the detected terminals is smaller than the preset value, retransmission is performed on ones of the data having an error reported based on the determined retransmission method.

9. The data transmitting method of claim 6, wherein a cyclic redundancy check (CRC) method is adopted for the error report.

10. The data transmitting method of claim 1, wherein Hybrid Automatic Repeat reQuest (HARQ) mechanism is adopted for the data transmission retransmission.

11. A data receiving method in a Multimedia Broadcast Multicast Service (MBMS) system, comprising:
    checking whether to receive data provided from the MBMS; and
    controlling a feedback channel based on control information including feedback channel information, the feedback channel information including information on whether to perform error report feedback for retransmission of the data, which is determined based on a number of the terminals receiving the data.

12. The data receiving method of claim 11, wherein said checking whether to receive data includes:
    receiving a polling request message for requesting polling of whether to receive the data provided from the MBMS; and
    transmitting a polling response message for polling response to the polling request message to a base station.

13. The data receiving method of claim 12, wherein the polling response is made using an identifier.

14. The data receiving method of claim 13, wherein the identifier is used for determining when the polling response is transmitted to the base station based on a predetermined polling cycle (P) and a polling interval (T).

15. The data receiving method of claim 12, wherein the determination is made by comparing the number of the terminals receiving the data with a preset value.

16. The data receiving method of claim 15, wherein said controlling a feedback channel includes:
    when the number of the terminals receiving the data is larger than the preset value, adopting a retransmission method without error report feedback for retransmission of the data; and
    when the number of the detected terminals is smaller than the preset value, adopting a retransmission method with error report feedback for retransmission of the data and using the feedback channel as a channel for transmitting the error report.

17. The data receiving method of claim 16, wherein the preset value is set up based on the amount of retransmitted data according to whether or not there is an the feedback.

18. The data receiving method of claim 16, wherein when the number of the detected terminals is larger than the preset value, retransmission is performed on all of the data based on the determined retransmission method; and when the number of the detected terminals is smaller than the preset value, retransmission is performed on ones of the data having an error reported based on the determined retransmission method.

19. The data receiving method of claim 16, wherein a cyclic redundancy check (CRC) method is adopted for the error report.

20. The data receiving method of claim 11, wherein Hybrid Automatic Repeat reQuest (HARQ) mechanism is adopted for the retransmission.

* * * * *